US012353860B2

(12) United States Patent
Uchiyama et al.

(10) Patent No.: US 12,353,860 B2
(45) Date of Patent: Jul. 8, 2025

(54) PROGRAMMABLE CONTROLLER SYSTEM, DEVELOPMENT SUPPORT DEVICE, AND RECORDING MEDIUM

(71) Applicant: Mitsubishi Electric Corporation, Tokyo (JP)

(72) Inventors: Naoya Uchiyama, Tokyo (JP); Jun Nakagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/723,866

(22) PCT Filed: Feb. 10, 2022

(86) PCT No.: PCT/JP2022/005418
§ 371 (c)(1),
(2) Date: Jun. 25, 2024

(87) PCT Pub. No.: WO2023/152890
PCT Pub. Date: Aug. 17, 2023

(65) Prior Publication Data
US 2024/0419415 A1 Dec. 19, 2024

(51) Int. Cl.
*G06F 9/44* (2018.01)
*G06F 8/41* (2018.01)
(Continued)

(52) U.S. Cl.
CPC ............ *G06F 8/41* (2013.01); *G06F 12/02* (2013.01)

(58) Field of Classification Search
CPC .......... G06F 8/41; G06F 12/02; G05B 19/056
See application file for complete search history.

(56) References Cited

U.S. PATENT DOCUMENTS 10,268,611 B2 * 4/2019 Xiao .................... G05B 19/056
2017/0003907 A1 * 1/2017 Kunisada .................. G06F 8/76
(Continued)

FOREIGN PATENT DOCUMENTS

CN 110892378 A * 3/2020 ......... G06F 12/0261
CN 112272821 A * 1/2021 .......... G05B 19/056
(Continued)

OTHER PUBLICATIONS

Toshihiko Koju, Re-constructing High-Level Information for Language-Specific Binary Re-optimization, 2016, pp. 1-11. https://ieeexplore.ieee.org/stamp/stamp.jsp?tp=&arnumber=7559551 (Year: 2016).*
(Continued)

Primary Examiner — Mongbao Nguyen
(74) Attorney, Agent, or Firm — XSENSUS LLP

(57) ABSTRACT

A programmable controller system includes compiling circuitry to store, into an initial variable storage area in a memory area in a programmable controller, an initial variable in a program organization unit (POU) included in source code of a program for the programmable controller and an additional variable storage address indicating an address of an additional variable storage area to store a variable added to the POU, store, when a variable is determined to have been added to the POU, all additional variables associated with the POU with the added variable into the additional variable storage area in the memory area, and compile the source code to generate the machine language object, and variable addition responding circuitry to define or relocate, when a variable is added to the POU, the additional variable storage area in a free space in the memory area, and update the additional variable storage address.

5 Claims, 13 Drawing Sheets

(51) Int. Cl.
*G06F 9/445* (2018.01)
*G06F 9/455* (2018.01)
*G06F 12/02* (2006.01)

(56) References Cited

U.S. PATENT DOCUMENTS

| | | | | |
|---|---|---|---|---|
| 2020/0125378 A1* | 4/2020 | Tshouva | .................. | G06F 21/54 |
| 2020/0264970 A1* | 8/2020 | Lee | .................. | G06F 12/02 |
| 2021/0286718 A1* | 9/2021 | Ravindar | ................ | G06F 8/443 |
| 2022/0206767 A1* | 6/2022 | Lee | ....................... | G06F 21/577 |

FOREIGN PATENT DOCUMENTS

| | | | |
|---|---|---|---|
| JP | 2005-301520 | A | 10/2005 |
| JP | 2012-216150 | A | 11/2012 |
| JP | 2012-234272 | A | 11/2012 |
| JP | 2015-022511 | A | 2/2015 |
| JP | 2015-125713 | A | 7/2015 |

OTHER PUBLICATIONS

Patrick W. Sathyanathan, Incremental Whole Program Optimization and Compilation, 2017, pp. 1-12. https://ieeexplore.ieee.org/stamp/stamp.jsp?tp=&arnumber=7863742 (Year: 2017).*
English translation, Arai (CN 112272821 A), 2021, pp. 1-12. (Year: 2021).*
Nicholas Harvey-Lees-Green, A Dynamic Memory Management Unit for Real Time Systems, 2017, pp. 1-8. https://ieeexplore.ieee.org/stamp/stamp.jsp?tp=&arnumber=7964874 (Year: 2017).*
English translation, Wang (CN 110892378 A), 2020, pp. 1-13. (Year: 2020).*
International Search Report and Written Opinion mailed on Apr. 26, 2022, received for PCT Application PCT/JP2022/005418, filed on Oct. 2, 2022, 8 pages including English Translation.
Decision to Grant mailed on Jul. 26, 2022, received for JP Application 2022-538050, 5 pages including English Translation.
Office Action issued Mar. 21, 2025 in corresponding Chinese Patent Application No. No. 202280086952.2.

* cited by examiner

| INSTANCE INFORMATION | | | | | |
|---|---|---|---|---|---|
| INSTANCE NUMBER | POU TYPE | LEADING ADDRESS | INSTANCE SIZE (BYTE) | ADDITIONAL VARIABLE STORAGE ADDRESS | ADDITIONAL VARIABLE STORAGE SIZE (BYTE) |
| 1 | FB1 | 1000 | 8 | NULL | 0 |
| 2 | FB2 | 1008 | 8 | NULL | 0 |
| 3 | FB1 | 1016 | 8 | NULL | 0 |

| VARIABLE INFORMATION | | | | | |
|---|---|---|---|---|---|
| POU TYPE | STORAGE | VARIABLE NAME | DATA TYPE | SIZE (BYTE) | RELATIVE ADDRESS |
| FB1 | INITIAL VARIABLE STORAGE | VARIABLE 1 | INT | 2 | 0 |
| | | VARIABLE 2 | WORD | 2 | 2 |
| | | ADDITIONAL VARIABLE STORAGE ADDRESS | – | 4 | 4 |
| | ADDITIONAL VARIABLE STORAGE | – | – | – | – |
| FB2 | INITIAL VARIABLE STORAGE | VARIABLE 3 | INT | 2 | 0 |
| | | VARIABLE 4 | WORD | 2 | 2 |
| | | ADDITIONAL VARIABLE STORAGE ADDRESS | – | 4 | 4 |
| | ADDITIONAL VARIABLE STORAGE | – | – | – | – |

FIG.5B

| INSTANCE INFORMATION | | | | | |
|---|---|---|---|---|---|
| INSTANCE NUMBER | POU TYPE | LEADING ADDRESS | INSTANCE SIZE (BYTE) | ADDITIONAL VARIABLE STORAGE ADDRESS | ADDITIONAL VARIABLE STORAGE SIZE (BYTE) |
| 1 | FB1 | 1000 | 8 | 1024 | 6 |
| 2 | FB2 | 1008 | 8 | NULL | 0 |
| 3 | FB1 | 1016 | 8 | 1030 | 6 |

| VARIABLE INFORMATION | | | | | |
|---|---|---|---|---|---|
| POU TYPE | STORAGE | VARIABLE NAME | DATA TYPE | SIZE (BYTE) | RELATIVE ADDRESS |
| FB1 | INITIAL VARIABLE STORAGE | VARIABLE 1 | INT | 2 | 0 |
| | | VARIABLE 2 | WORD | 2 | 2 |
| | | ADDITIONAL VARIABLE STORAGE ADDRESS | - | 4 | 4 |
| | ADDITIONAL VARIABLE STORAGE | ADDITIONAL VARIABLE 1 | INT | 2 | 0 |
| | | ADDITIONAL VARIABLE 2 | INT | 2 | 2 |
| | | ADDITIONAL VARIABLE 3 | INT | 2 | 4 |
| FB2 | INITIAL VARIABLE STORAGE | VARIABLE 3 | INT | 2 | 0 |
| | | VARIABLE 4 | WORD | 2 | 2 |
| | | ADDITIONAL VARIABLE STORAGE ADDRESS | - | 4 | 4 |
| | ADDITIONAL VARIABLE STORAGE | - | - | - | - |

| VARIABLE ADDITION INFORMATION | | | | |
|---|---|---|---|---|
| INFORMATION NUMBER | VARIABLE RELOCATION INFORMATION | | | ADDITIONAL VARIABLE STORAGE ADDRESS |
| | SOURCE ADDRESS | DESTINATION ADDRESS | SIZE (BYTE) | LEADING ADDRESS |
| 1 | NULL | 1024 | 6 | 1004 |
| 2 | NULL | 1030 | 6 | 1020 |

FIG.5C

| INSTANCE INFORMATION | | | | | |
|---|---|---|---|---|---|
| INSTANCE NUMBER | POU TYPE | LEADING ADDRESS | INSTANCE SIZE (BYTE) | ADDITIONAL VARIABLE STORAGE ADDRESS | ADDITIONAL VARIABLE STORAGE SIZE (BYTE) |
| 1 | FB1 | 1000 | 8 | 1036 | 12 |
| 2 | FB2 | 1008 | 8 | NULL | 0 |
| 3 | FB1 | 1016 | 8 | 1048 | 12 |

| VARIABLE INFORMATION | | | | | |
|---|---|---|---|---|---|
| POU TYPE | STORAGE | VARIABLE NAME | DATA TYPE | SIZE (BYTE) | RELATIVE ADDRESS |
| FB1 | INITIAL VARIABLE STORAGE | VARIABLE 1 | INT | 2 | 0 |
| | | VARIABLE 2 | WORD | 2 | 2 |
| | | ADDITIONAL VARIABLE STORAGE ADDRESS | - | 4 | 4 |
| | ADDITIONAL VARIABLE STORAGE | ADDITIONAL VARIABLE 1 | INT | 2 | 0 |
| | | ADDITIONAL VARIABLE 2 | INT | 2 | 2 |
| | | ADDITIONAL VARIABLE 3 | INT | 2 | 4 |
| | | ADDITIONAL VARIABLE 4 | INT | 2 | 6 |
| | | ADDITIONAL VARIABLE 5 | INT | 2 | 8 |
| | | ADDITIONAL VARIABLE 6 | INT | 2 | 10 |
| FB2 | INITIAL VARIABLE STORAGE | VARIABLE 3 | INT | 2 | 0 |
| | | VARIABLE 4 | WORD | 2 | 2 |
| | | ADDITIONAL VARIABLE STORAGE ADDRESS | - | 4 | 4 |
| | ADDITIONAL VARIABLE STORAGE | - | - | - | - |

| VARIABLE ADDITION INFORMATION | | | | |
|---|---|---|---|---|
| INFORMATION NUMBER | VARIABLE RELOCATION INFORMATION | | | ADDITIONAL VARIABLE STORAGE ADDRESS |
| | SOURCE ADDRESS | DESTINATION ADDRESS | SIZE (BYTE) | LEADING ADDRESS |
| 1 | 1024 | 1036 | 6 | 1004 |
| 2 | 1030 | 1048 | 6 | 1020 |

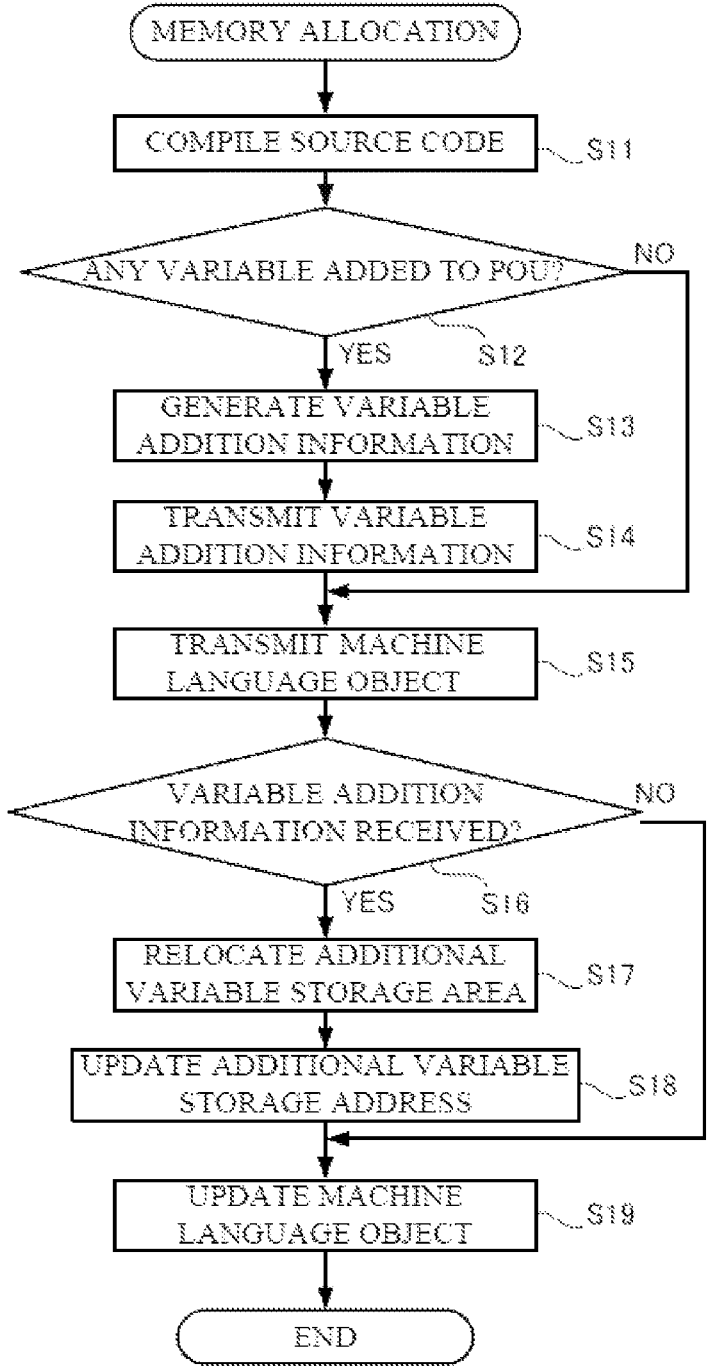

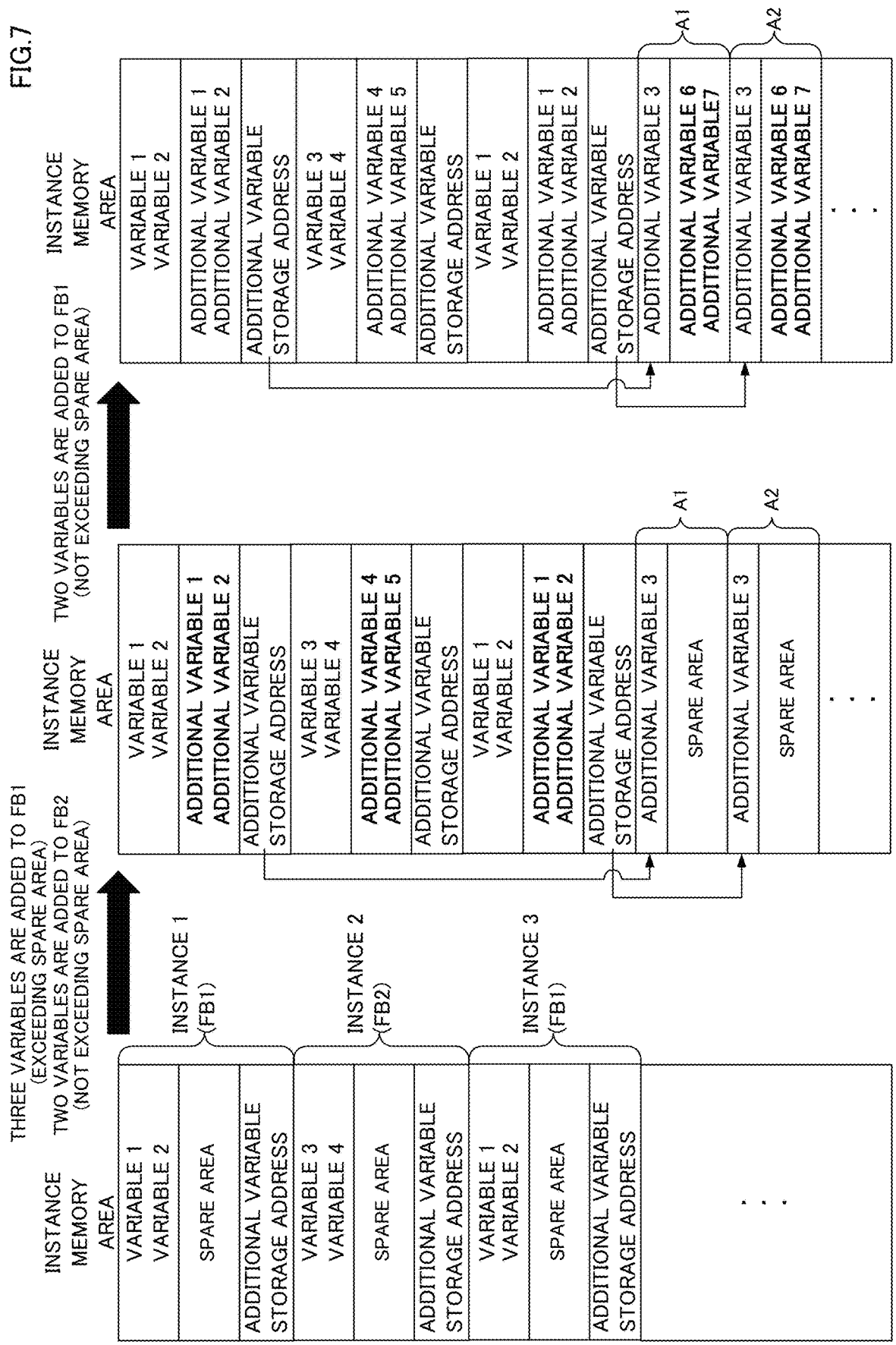

FIG.8

CALLING PROGRAM

| 1 | 2 | 3 | 4 | 5 | 6 | 7 | 8 | 9 | 10 | 11 | 12 |
|---|---|---|---|---|---|---|---|---|---|---|---|
| | | | | | INSTANCE 1 (FB1) | | CALL INSTANCE 1 OF FB1 TYPE | | | | |
| | | | | | INSTANCE 3 (FB1) | | CALL INSTANCE 3 OF FB1 TYPE | | | | |
| | | | | | | | | | | | [END] |

PROGRAM OF FB1 TYPE

| 1 | 2 | 3 | 4 | 5 | 6 | 7 | 8 | 9 | 10 | 11 | 12 |
|---|---|---|---|---|---|---|---|---|---|---|---|
| VARIABLE 1 | | | | | | | | | | VARIABLE 2 | |
| | | | | | INSTANCE 2 (FB2) | | CALL INSTANCE OF FB2 TYPE FOR INSTANCE 1: CALL INSTANCE 2 FOR INSTANCE 3: CALL INSTANCE 4 | | | | |

PROGRAM OF FB2 TYPE

| 1 | 2 | 3 | 4 | 5 | 6 | 7 | 8 | 9 | 10 | 11 | 12 |
|---|---|---|---|---|---|---|---|---|---|---|---|
| VARIABLE 3 | | | | | | | | | | VARIABLE 4 | |

▼ THREE VARIABLES ARE ADDED TO PROGRAM OF FB1 TYPE (ADDITIONAL VARIABLES 1 TO 3)

PROGRAM OF FB1 TYPE

| 1 | 2 | 3 | 4 | 5 | 6 | 7 | 8 | 9 | 10 | 11 | 12 |
|---|---|---|---|---|---|---|---|---|---|---|---|
| VARIABLE 1 | | | | | | | | | | VARIABLE 2 | |
| | | | | | INSTANCE 2 (FB2) | | | | | | |
| ADDITIONAL VARIABLE 1 | | | | | | | | | | ADDITIONAL VARIABLE 2 | |
| | | | | | | | | | | ADDITIONAL VARIABLE 3 | |

▼ THREE VARIABLES ARE ADDED TO PROGRAM OF FB2 TYPE (ADDITIONAL VARIABLES 4 TO 6)

PROGRAM OF FB2 TYPE

| 1 | 2 | 3 | 4 | 5 | 6 | 7 | 8 | 9 | 10 | 11 | 12 |
|---|---|---|---|---|---|---|---|---|---|---|---|
| VARIABLE 3 | | | | | | | | | | VARIABLE 4 | |
| ADDITIONAL VARIABLE 4 | | | | | | | | | | ADDITIONAL VARIABLE 5 | |
| | | | | | | | | | | ADDITIONAL VARIABLE 6 | |

▼ THREE VARIABLES ARE ADDED TO PROGRAM OF FB1 TYPE (ADDITIONAL VARIABLES 7 TO 9)

PROGRAM OF FB1 TYPE

| 1 | 2 | 3 | 4 | 5 | 6 | 7 | 8 | 9 | 10 | 11 | 12 |
|---|---|---|---|---|---|---|---|---|---|---|---|
| VARIABLE 1 | | | | | | | | | | VARIABLE 2 | |
| | | | | | INSTANCE 2 (FB2) | | | | | | |
| ADDITIONAL VARIABLE 1 | | | | | | | | | | ADDITIONAL VARIABLE 2 | |
| | | | | | | | | | | ADDITIONAL VARIABLE 3 | |
| ADDITIONAL VARIABLE 7 | | | | | | | | | | ADDITIONAL VARIABLE 8 | |
| | | | | | | | | | | ADDITIONAL VARIABLE 9 | |

PROGRAMMABLE CONTROLLER SYSTEM, DEVELOPMENT SUPPORT DEVICE, AND RECORDING MEDIUM

CROSS-REFERENCE TO RELATED APPLICATION

This application is a national stage application, pursuant to 35 U.S.C. § 371, of International Patent Application No. PCT/JP2022/005418, filed Feb. 10, 2022, the entire contents of which are incorporated herein by reference.

TECHNICAL FIELD

The present disclosure relates to a programmable controller system, a development support device, a memory allocation method, and a program.

BACKGROUND ART

A program for a programmable controller typically includes functional units called program organization units (POUs) with variables. When a program for a programmable controller is to be changed during operation, the address of each variable in a POU stored in a memory area in the programmable controller basically cannot be changed. Such a change in the variable address causes access to a memory different from a memory before the address change, thus causing the programmable controller to malfunction. To avoid this, the memory area includes spare areas into which variables added to the POU are stored. However, large areas cannot be predefined as such spare areas that may remain unused without variables being added. The variables initially stored in the memory area are hereafter referred to as initial variables, and the variables added to the POU are hereafter referred to as additional variables.

Patent Literature 1 describes a programmable controller system that defines, when more variables are added than the number of spare areas, an additional area in a free space and stores the address of the additional area into the spare area. The technique described in Patent Literature 1 allows access to additional variables stored in the additional area through the address stored in the spare area when such access is caused by the program for the programmable controller.

CITATION LIST

Patent Literature

Patent Literature 1: Unexamined Japanese Patent Application Publication No. 2012-234272

SUMMARY OF INVENTION

Technical Problem

With the technique described in Patent Literature 1, the address stored in the spare area is read for access to the additional variables stored in the additional area using the address. Such access takes a longer processing time than access to the initial variables. When variables with a size exceeding the additional area to be added, another additional area is defined in the free space. This creates additional areas of multiple levels and causes the additional variables to be accessed through multiple addresses. This further increases the processing time. The technique described in Patent Literature 1 may lower the execution performance of the program by repeatedly adding variables.

In response to the above issue, an objective of the present disclosure is to avoid lowering the program execution performance through repeated addition of variables to a POU.

Solution to Problem

To achieve the above objective, a programmable controller system according to an aspect of the present disclosure is a programmable controller system that compiles source code of a program for a programmable controller to generate a machine language object and causes the programmable controller to execute the machine language object. The programmable controller system according to the aspect of the present disclosure includes a compiler and a variable addition responder. The compiler stores, into an initial variable storage area in a memory area in the programmable controller, an initial variable in a program organization unit with variables included in the source code written with the program organization unit and an additional variable storage address indicating an address of an additional variable storage area to store a variable added to the program organization unit, determines whether a variable has been added to the program organization unit, stores, when a variable is determined to have been added to the program organization unit, all additional variables associated with the program organization unit with the added variable into the additional variable storage area in the memory area, and compiles the source code to generate the machine language object. The variable addition responder defines or relocates, when a variable is determined to have been added to the program organization unit, the additional variable storage area for the program organization unit with the added variable in a free space in the memory area, and updates the additional variable storage address.

Advantageous Effects of Invention

In the programmable controller system according to the above aspect of the present disclosure, when a variable is added to the program organization unit, an additional variable storage area is defined or relocated in a free space in the memory area, and the address of the additional variable storage area is updated for access to the added variable based on the position relative to a single address to avoid lowering the execution performance of the program through repeated addition of variables to the program organization unit.

BRIEF DESCRIPTION OF DRAWINGS

FIG. 2 is a diagram illustrating example addition of variables to a program organization unit (POU);

FIG. 5A is a set of tables illustrating examples of instance information and variable information in Embodiment 1;

FIG. 5B is a set of tables illustrating examples of the instance information, the variable information, and variable addition information in Embodiment 1 when additional variables 1 to 3 are added;

FIG. 5C is a set of tables illustrating examples of the instance information, the variable information, and the variable addition information in Embodiment 1 when additional variables 4 to 6 are added;

FIG. 6 is a flowchart of the memory allocation in Embodiment 1;

FIG. 7 is a schematic diagram describing memory allocation when variables are added to POUs in Embodiment 2;

FIG. 8 is a schematic diagram illustrating example addition of variables to POUs when a POU calls another POU;

DESCRIPTION OF EMBODIMENTS

Figure 1:
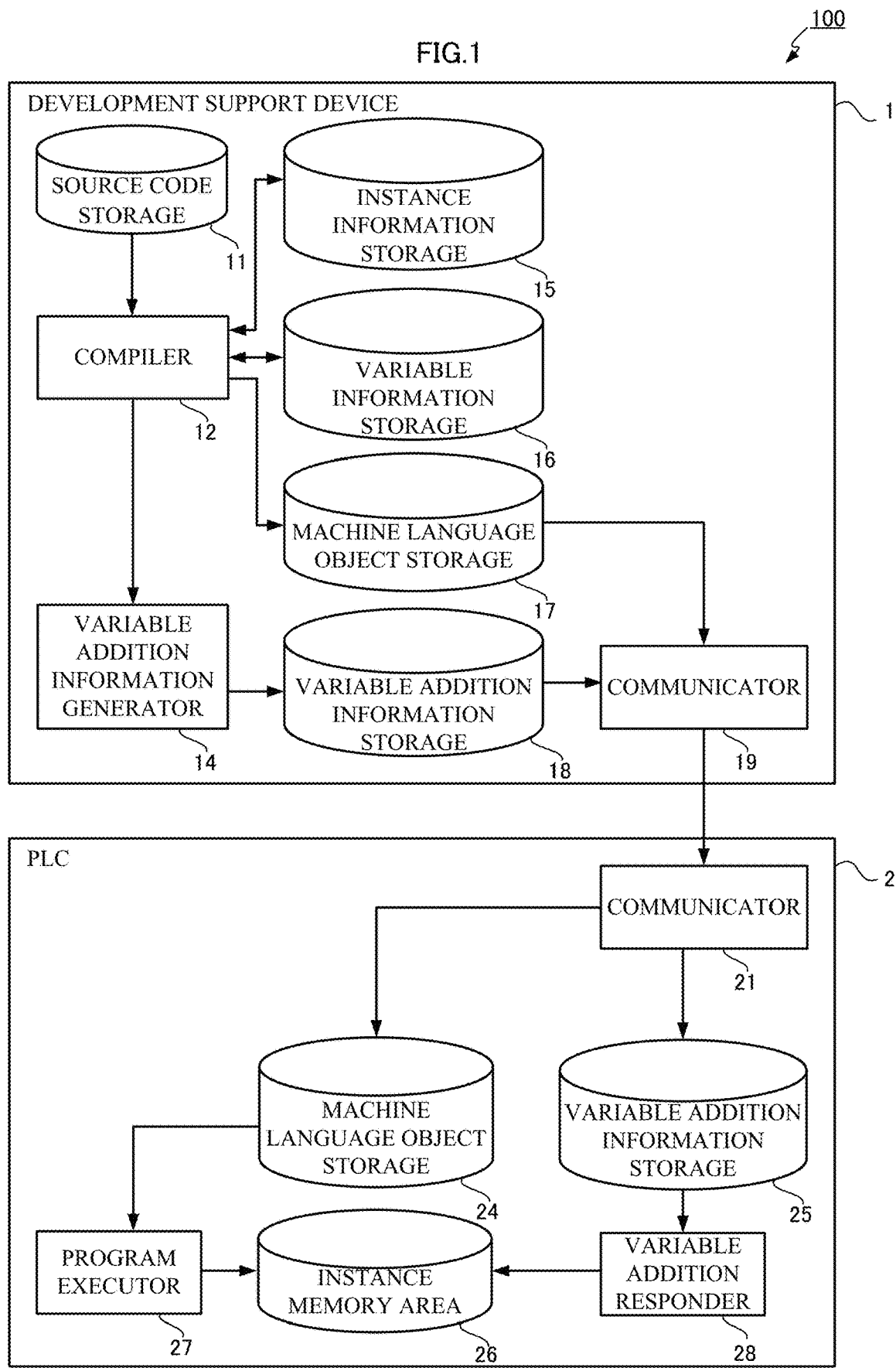
FIG. 1 is a functional block diagram of a programmable controller system according to Embodiment 1.

A programmable controller system, a development support device, a memory allocation method, and a program according to an embodiment are described below in detail with reference to the drawings. Like reference signs denote like or corresponding components in the drawings. A programmable controller is hereafter referred to as a programmable logic controller (PLC). In the present embodiment, source code of a program for a PLC is written with functional units referred to as program organization units (POUs) each including variables. The POUs are, for example, of three types, or specifically, a program (PROGRAM), a function block (FB), and a function (FUN). In the embodiment described below, variables are added to one or more FBs. Each FB is activated by a program or another FB calling the FB. The FB refers to a type of POU. To call an FB, an instance is declared to use the instance name.

Embodiment 1

As illustrated in FIG. 1, a programmable controller system 100 includes a development support device 1 that creates a program for a PLC 2 and writes the program into the PLC 2, and the PLC 2 that executes the program created by the development support device 1.

The development support device 1 includes a source code storage 11 that stores source code of the program for the PLC 2, and a compiler 12 that compiles the source code stored in the source code storage 11, determines whether variables have been added to a POU, and generates a machine language object to be executed by the PLC 2.

The development support device 1 further includes a variable addition information generator 14 that generates, when variables are determined to have been added to a POU, variable addition information to cause the PLC 2 to store the variables into a memory area, an instance information storage 15 that stores instance information indicating allocation of the memory area in the PLC 2 for instances in the POU, a variable information storage 16 that stores variable information indicating the variables included in the POU, a machine language object storage 17 that stores the machine language object generated by the compiler 12, a variable addition information storage 18 that stores variable addition information generated by the variable addition information generator 14, and a communicator 19 that transmits and receives information to and from the PLC 2. The instance information is an example of memory allocation information.

The PLC 2 includes a communicator 21 that transmits and receives information to and from the development support device 1, a machine language object storage 24 that stores the machine language object received from the development support device 1, a variable addition information storage 25 that stores the variable addition information received from the development support device 1, and an instance memory area 26 in which the instances of the POU are placed. The PLC 2 further includes a program executor 27 that executes the machine language object stored in the machine language object storage 24, and a variable addition responder 28 that relocates the variables to the instance memory area 26 based on the variable addition information stored in the variable addition information storage 25.

The source code storage 11 in the development support device 1 stores the source code of the program for the PLC 2. When the source code stored in the source code storage 11 is updated, the compiler 12 stores, into an initial variable storage area in the instance memory area 26, initial variables in the POU included in the updated source code and additional variable storage addresses indicating the addresses of additional variable storage areas that store the variables added to the POU, and compiles the source code. This generates the instance information, the variable information, and the machine language object.

The compiler 12 compares the instance information and the variable information of the program before the update stored respectively in the instance information storage 15 and in the variable information storage 16 with the generated instance information and the generated variable information to determine whether variables have been added to a POU. When the compiler 12 determines that variables have been added to a POU, the variable addition information generator 14 generates the variable addition information including the source addresses and the destination addresses of the additional variable storage areas for the instances of the POU with added variables.

The compiler 12 updates the instance information stored in the instance information storage 15 to the generated instance information. The compiler 12 updates the variable information stored in the variable information storage 16 to the generated variable information. The machine language object storage 17 stores the machine language object generated by the compiler 12. The variable addition information storage 18 stores the variable addition information generated by the variable addition information generator 14. The communicator 19 transmits the machine language object and the variable addition information to the PLC 2.

The communicator 21 in the PLC 2 stores the machine language object into the machine language object storage 24 and stores the variable addition information received from the development support device 1 into the variable addition information storage 25. The program executor 27 places, in the instance memory area 26, the instances of the POU included in the machine language object stored in the machine language object storage 24 and updates the machine language object to be executed. The variable addition responder 28 defines or relocates, based on the variable addition information stored in the variable addition information storage 25, the additional variable storage areas for the instances of the POU with the added variables in a free space in the instance memory area 26, and updates the additional variable storage addresses to the destination addresses. When variables are added to a POU, the program executor 27 stores the added variables into the defined or relocated additional variable storage areas and updates the machine language object to be executed.

Figure 2:
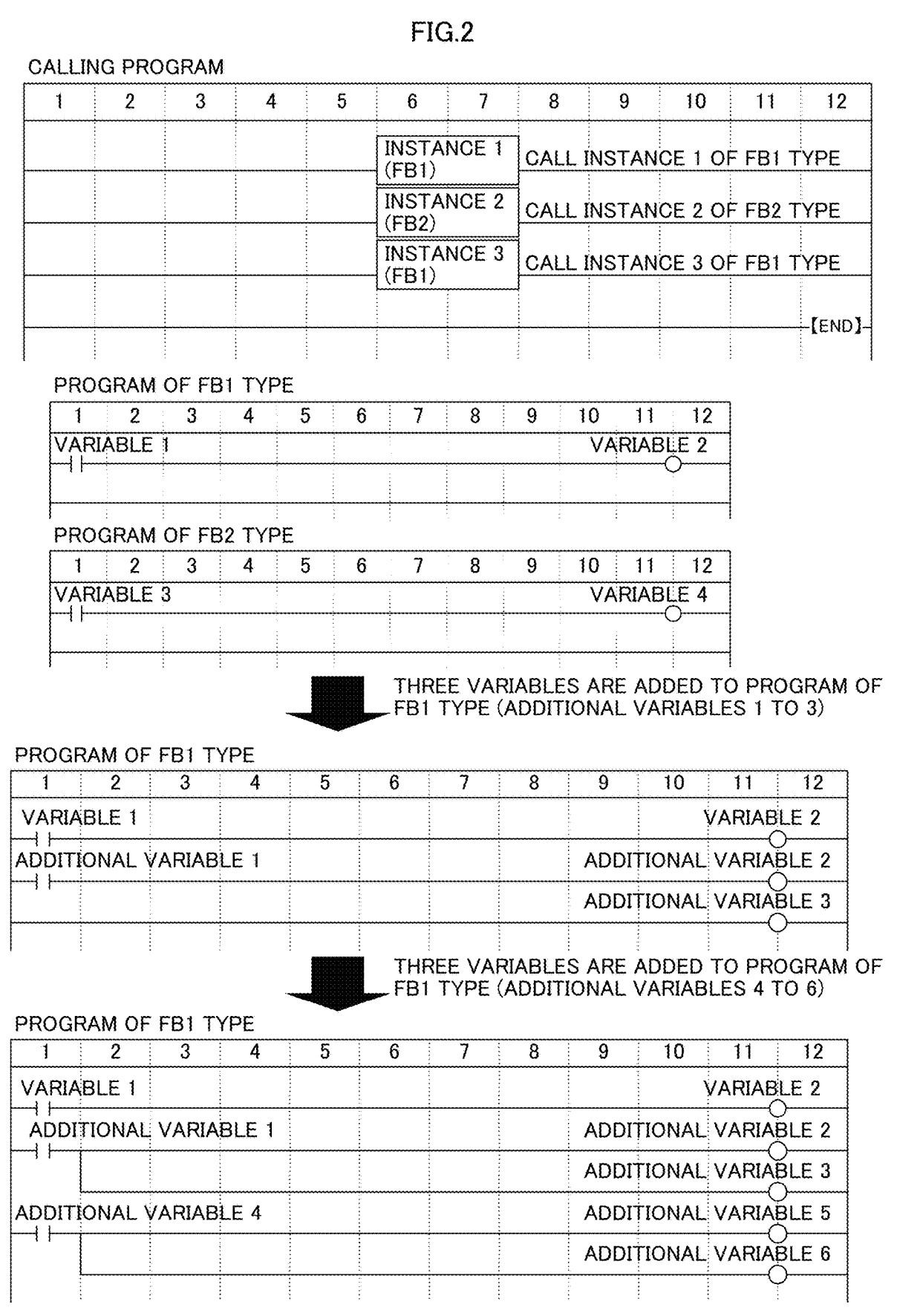

FIG. 2 illustrates example addition of variables to a POU. In the example in FIG. 2, a calling program calls an instance 1 of an FB1 type, an instance 2 of an FB2 type, and an instance 3 of the FB1 type. The program of the FB1 type includes a variable 1 and a variable 2. The program of the FB2 type includes a variable 3 and a variable 4. Three variables (additional variables 1 to 3) are added, and three more variables (additional variables 4 to 6) are further added to the program of the FB1 type.

Figure 3:
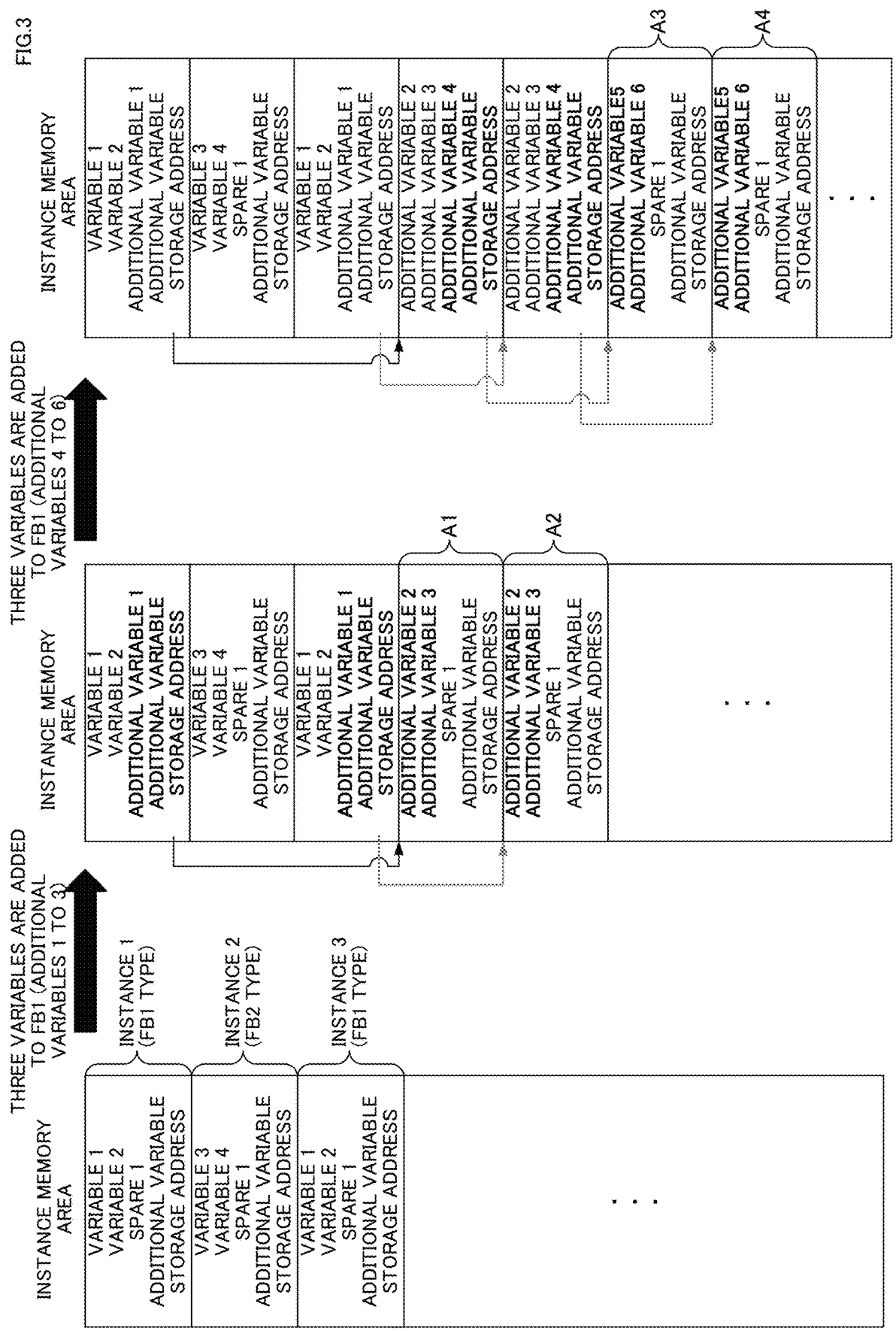
FIG. 3 is a schematic diagram describing memory allocation using a known technique when the variables are added to the POU.

With reference to FIG. 3, storing variables into the instance memory area 26 using the technique described in Patent Literature 1 is described. This is performed when, as illustrated in FIG. 2, the three variables (additional variables 1 to 3) are added and then the three more variables (additional variables 4 to 6) are further added to the program of the FB1 type.

With the technique described in Patent Literature 1, as illustrated in FIG. 3, when the three variables (additional variables 1 to 3) are added to the program of the FB1 type, the additional variable 1 is stored into a spare area (spare 1) in the instance 1 of the FB1 type, and an additional variable storage area A1 for the instance 1 is defined in the free space to store the additional variables 2 and 3. The address of the additional variable storage area A1 for the instance 1 is stored as the additional variable storage address in the instance 1. The additional variable storage area A1 for the instance 1 includes a new spare area (spare 1) and a new additional variable storage address.

Similarly, when the three variables (additional variables 1 to 3) are added to the program of the FB1 type, the additional variable 1 is stored into a spare area (spare 1) in the instance 3 of the FB1 type, and an additional variable storage area A2 for the instance 3 is defined in the free space to store the additional variables 2 and 3. The address of the additional variable storage area A2 for the instance 3 is stored as the additional variable storage address in the instance 3. The additional variable storage area A2 for the instance 3 includes a new spare area (spare 1) and a new additional variable storage address.

When the three more variables (additional variables 4 to 6) are added to the program of the FB1 type, the additional variable 4 is stored into the spare area (spare 1) in the additional variable storage area A1 for the instance 1, and an additional variable storage area A3 for the instance 1 is defined in the free space to store the additional variables 5 and 6. The address of the additional variable storage area A3 for the instance 1 is stored as the additional variable storage address in the additional variable storage area A1. The additional variable storage area A3 for the instance 1 includes a new spare area (spare 1) and a new additional variable storage address.

Similarly, when the three more variables (additional variables 4 to 6) are added to the program of the FB1 type, the additional variable 4 is stored into the spare area (spare 1) in the additional variable storage area A2 for the instance 3, and an additional variable storage area A4 for the instance 3 is defined in the free space to store the additional variables 5 and 6. The address of the additional variable storage area A4 for the instance 3 is stored as the additional variable storage address in the additional variable storage area A2 for the instance 3. The additional variable storage area A4 for the instance 3 includes a new spare area (spare 1) and a new additional variable storage address.

As described above, with the technique described in Patent Literature 1, repeated addition of variables creates additional areas of multiple levels and causes the additional variables to be accessed through more addresses, increasing the processing time.

Figure 4:
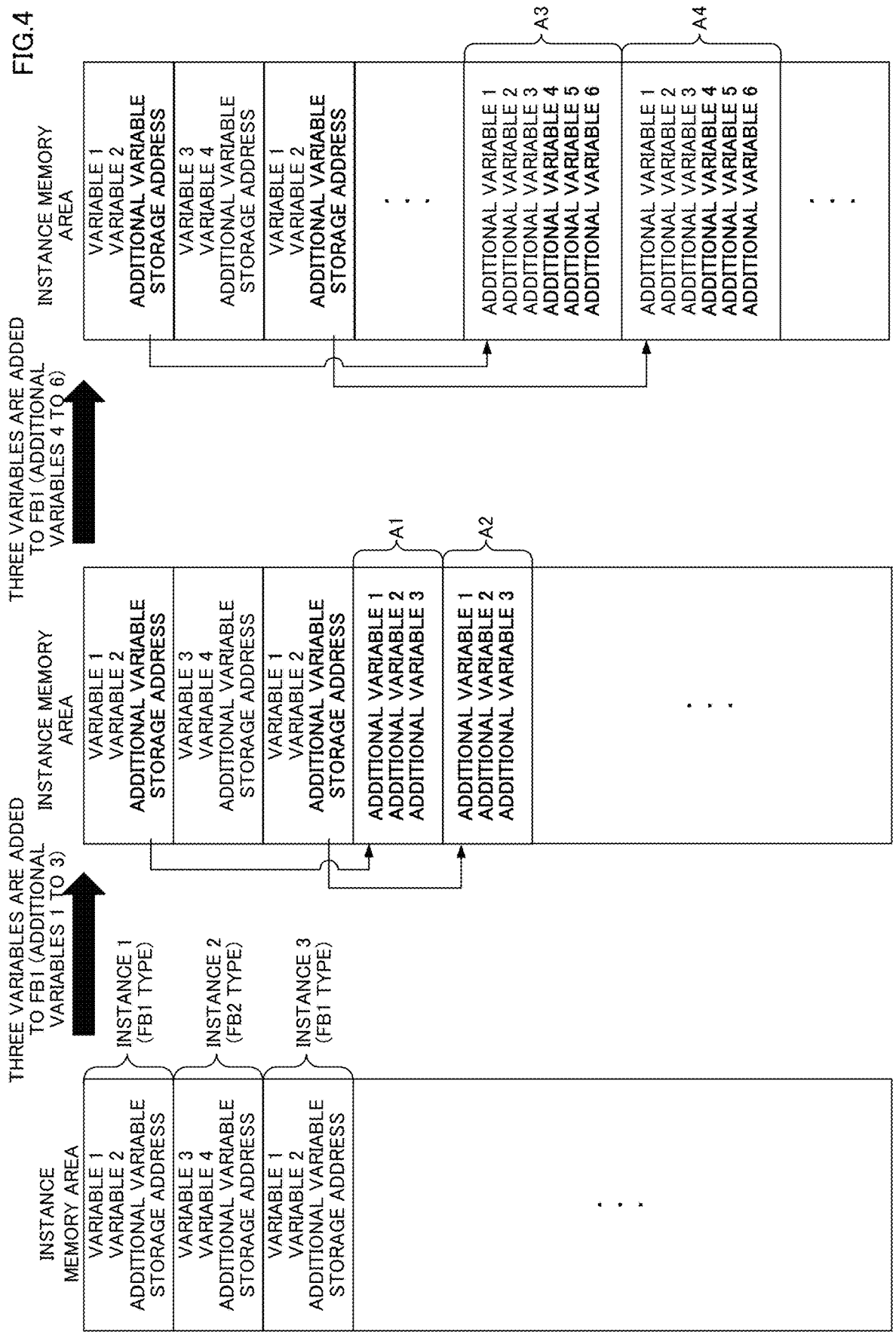
FIG. 4 is a schematic diagram describing memory allocation in the programmable controller system according to Embodiment 1 when the variables are added to the POU.

With reference to FIG. 4, storing variables into the instance memory area 26 in the programmable controller system 100 according to Embodiment 1 is described. This is performed when, as illustrated in FIG. 2, the three variables (additional variables 1 to 3) are added and the three more variables (additional variables 4 to 6) are further added to the program of the FB1 type.

As illustrated in FIG. 4, when the three variables (additional variables 1 to 3) are added to the program of the FB1 type, the additional variable storage area A1 for the instance 1 is defined in the free space to store the additional variables 1 to 3. The additional variable storage address in the instance 1 is updated to the address of the additional variable storage area A1 for the instance 1.

Similarly, when the three variables (additional variables 1 to 3) are added to the program of the FB1 type, the additional variable storage area A2 for the instance 3 is defined in the free space to store the additional variables 1 to 3. The additional variable storage address in the instance 3 is updated to the address of the additional variable storage area A2 for the instance 3.

When the three more variables (additional variables 4 to 6) are added to the program of the FB1 type, the additional variable storage area A3 for the instance 1 is defined in the free space to store the additional variables 1 to 6. The additional variable storage address in the instance 1 is updated to the address of the additional variable storage area A3 for the instance 1.

Similarly, when the three more variables (additional variables 4 to 6) are added to the program of the FB1 type, the additional variable storage area A4 for the instance 3 is defined in the free space to store the additional variables 1 to 6. The additional variable storage address in the instance 3 is updated to the address of the additional variable storage area A4 for the instance 3.

As described above, when variables are added to a POU in the programmable controller system 100, all the additional variables added to the instances of the POU are stored into the additional variable storage areas relocated to the free space in the instance memory area 26, and the additional variable storage addresses are updated to the destination addresses. Thus, when the variables are repeatedly added, the additional variables are accessed based on the position relative to a single address. This technique can thus reduce the processing time more than the technique described in Patent Literature 1. The PLC repeatedly performs arithmetic operations caused by the program and the system processing during operation. In the programmable controller system 100, the relocation of additional variables to the instance memory area 26 is performed in the system processing and thus increases the system processing time. However, the time taken for arithmetic operations caused by the program is typically much longer than the system processing time, and the system processing time increases temporarily during the relocation of additional variables. The technique can still reduce the processing time without being affected greatly.

The instance information, the variable information, and the variable addition information are now described with reference to FIGS. 5A to 5C. These items of information are generated when, as illustrated in FIG. 4, the three variables (additional variables 1 to 3) are added and the three more variables (additional variables 4 to 6) are further added to the program of the FB1 type.

When the source code calls the instance 1 of the FB1 type including the variables 1 and 2, the instance 2 of the FB2 type including the variables 3 and 4, and the instance 3 of the FB1 type, the compiler 12 generates, for example, the instance information and the variable information illustrated in FIG. 5A.

In the example in FIG. 5A, the instance information includes the instance number for identifying the instances, the POU type indicating the POU types of the instances, the leading address indicating leading addresses of the memory area into which the instances are placed, the instance size indicating the sizes of the instances, the additional variable storage address indicating addresses of the additional variable storages for the instances, and the additional variable storage size indicating the sizes of the additional variable storages. The value of each additional variable storage address before the variables are added is null with no additional variable storage area being defined. In the example in FIG. 5A, the variable information includes the POU type indicating the POU types of the variables, the storage indicating the storages storing the variables, the variable name indicating the names of the variables, the data type indicating the data types of the variables, the size indicating the sizes of the variables, and the relative address indicating relative addresses of the variables in the memory area in which the instances are placed.

When the additional variables 1 to 3 are added to the program of the FB1 type, the compiler 12 generates the instance information and the variable information, and the variable addition information generator 14 generates the variable addition information as illustrated in, for example, FIG. 5B.

In the example in FIG. 5B, the variable addition information includes the information number for identifying items of the variable addition information, the source address indicating source addresses of the additional variable storage areas for the instances relocated upon the addition of the additional variables 1 to 3, the destination address indicating destination addresses of the additional variable storage areas for the instances relocated upon the addition of the additional variables 1 to 3, the size indicating the total size of the additional variables 1 to 3, and the leading address indicating addresses at which the additional variable storage addresses are stored. When an additional variable storage area is defined in the free space for the first time, the value of the source address is null with no additional variable storage area located at the source address. The addresses of the additional variable storage areas defined for the instances are input as the additional variable storage address in the instance information. Information about the additional variables 1 to 3 is input as the variable name, the data type, the size, and the relative address in the variable information.

When the additional variables 4 to 6 are further added to the program of the FB1 type, the compiler 12 generates the instance information and the variable information, and the variable addition information generator 14 generates the variable addition information as illustrated in, for example, FIG. 5C.

In the example in FIG. 5C, the source addresses of the additional variable storage areas for the instances relocated upon the addition of the additional variables 4 to 6 are input as the source address included in the variable addition information. The destination addresses of the additional variable storage areas for the instances relocated upon the addition of the variables 4 to 6 are input as the destination address in the variable addition information. The addresses in the additional variable storage address in the instance information are updated to the addresses of the relocated additional variable storage areas for the instances. Information about the additional variables 4 to 6 is input as the variable name, the data type, the size, and the relative address in the variable information.

Memory allocation performed by the programmable controller system 100 is now described with reference to FIG. 6. The memory allocation illustrated in FIG. 6 starts when the source code of the program for PLC 2 stored in the source code storage 11 is updated.

The compiler 12 stores, into the initial variable storage areas in the instance memory area 26, the initial variables in the POUs included in the updated source code of the program for the PLC 2 and the additional variable storage addresses that indicate the addresses of additional variable storage areas when variables are added, and compiles the source code (step S11). This generates the instance information, the variable information, and the machine language object. In step S11, when variables are added to any of the POUs, the compiler 12 stores all the additional variables associated with the POU with the added variables into the additional variable storage areas in the instance memory area 26, and compiles the source code.

The compiler 12 compares the instance information and the variable information of the program before the update stored respectively in the instance information storage 15 and in the variable information storage 16 with the generated instance information and the generated variable information to determine whether variables have been added to any of the POUs in the source code (step S12). When no variable has been added to the POUs in the source code (No in step S12), the processing advances to step S15. When variables have been added to any of the POUs in the source code (Yes in step S12), the variable addition information generator 14 generates the variable addition information including the source addresses and the destination addresses of the additional variable storage areas for the instances of the POU with the added variables (step S13).

As illustrated in, for example, FIG. 4, when the additional variables 1 to 3 are added to the program of the FB1 type, the variable addition information as illustrated in, for example, FIG. 5B, is generated in step S13. In step S13, when the additional variables 4 to 6 are added to the program of the FB1 type, the variable addition information as illustrated in, for example, FIG. 5C, is generated.

Referring back to FIG. 6, the communicator 19 in the development support device 1 transmits the variable addition information generated by the variable addition information generator 14 to the PLC 2 (step S14), and transmits the machine language object generated by the compiler 12 to the PLC 2 (step S15).

When the communicator 21 in the PLC 2 receives no variable addition information from the development support device 1 (No in step S16), the processing advances to step S19. When the communicator 21 receives the variable addition information from the development support device 1 (Yes in step S16), the variable addition responder 28 relocates, based on the variable addition information received from the development support device 1, the additional variable storage areas for the instances of the POU with the added variables (step S17) and updates the additional variable storage addresses to the destination addresses (step S18).

For example, when the communicator 21 receives the variable addition information as illustrated in FIG. 5B from the development support device 1 in step S16, the variable addition responder 28 defines, based on the variable addition information, an additional variable storage area for the instance 1 of the FB1 type at address 1024 and an additional variable storage area for the instance 3 of the FB1 type at address 1030 in step S17. In step S18, the variable addition responder 28 updates the additional variable storage address in the instance 1 of the FB1 type to 1024, and the additional variable storage address in the instance 3 of the FB1 type to 1030.

When the communicator 21 further receives the variable addition information as illustrated in FIG. 5C from the development support device 1 in step S16, the variable addition responder 28 relocates, based on the variable addition information, the additional variable storage area for the instance 1 of the FB1 type from address 1024 to address 1036, and the additional variable storage area for the instance 3 of the FB1 type from address 1030 to address 1048 in step S17. In step S18, the variable addition responder 28 updates the additional variable storage address in the instance 1 of the FB1 type to 1036, and the additional variable storage address in the instance 3 of the FB1 type to 1048.

Referring back to FIG. 6, the program executor 27 in the PLC 2 places, based on the instance information and the variable information received by the communicator 21 from the development support device 1, instances of the POUs included in the machine language object received by the communicator 21 from the development support device 1 in the instance memory area 26, updates the machine language object to be executed (step S19), and ends the processing. In step S19, when variables are added to a POU, the program executor 27 stores the additional variables into the additional variable storage area relocated in step S17, and updates the machine language object to be executed.

In the programmable controller system 100 according to Embodiment 1, when a variable is determined to have been added to an FB, an additional variable storage area is defined or relocated in the free space in the memory area, and the additional variable storage address is updated for access to the added variable based on the position relative to a single address. This can avoid lowering the execution performance of the program through repeated addition of variables to the FB.

Embodiment 2

In Embodiment 2, each instance includes a spare area, and when the total size of additional variables exceeds the size of the spare area, an additional variable storage area is defined in a free space to store the additional variables.

With reference to FIG. 7, storing variables into the instance memory area 26 in the programmable controller system 100 according to Embodiment 2 is described. This is performed when three variables (additional variables 1 to 3) are added, two more variables (additional variables 4 and 5) are added, and two more variables (additional variables 6 and 7) are further added to a program of the FB1 type.

As illustrated in FIG. 7, when the three variables (additional variables 1 to 3) are added to the program of the FB1 type, the additional variables 1 and 2 are stored into a spare area for an instance 1 of the FB1 type, and the additional variable 3, with the size exceeding the spare area, is stored into an additional variable storage area A1 for the instance 1 defined in the free space. The address of the additional variable storage area A1 for the instance 1 is stored as the additional variable storage address in the instance 1. The additional variable storage area A1 for the instance 1 includes a new spare area.

Similarly, when the three variables (additional variables 1 to 3) are added to the program of the FB1 type, the additional variables 1 and 2 are stored into a spare area in an instance 3 of the FB1 type, and the additional variable 3, with the size exceeding the spare area, is stored into an additional variable storage area A2 for the instance 3 defined in the free space. The address of the additional variable storage area A2 for the instance 3 is stored as the additional variable storage address in the instance 3. The additional variable storage area A2 for the instance 3 includes a new spare area.

When the two variables (additional variables 4 and 5) are added to the program of the FB2 type, the additional variables 4 and 5 are stored into a spare area in an instance 2 of the FB2 type. When the two variables (additional variables 6 and 7) are further added to the program of the FB1 type, the additional variables 6 and 7 are stored into the spare area in the additional variable storage area A1 for the instance 1 and in the spare area in the additional variable storage area A2 for the instance 3. The spare areas in the instances 1 to 3 are examples of first spare areas. The spare areas in the additional variable storage areas A1 and A2 are examples of second spare areas.

In the programmable controller system 100 according to Embodiment 2, when a variable is determined to have been added to the FB, an additional variable storage area is defined or relocated in the free space in the memory area, and the additional variable storage address is updated for access to the added variable based on the position relative to a single address. This can avoid lowering the execution performance of the program through repeated addition of variables to the FB. When the size of additional variables does not exceed the spare area, the variables are stored into the spare area without relocation to the additional variable storage area, reducing the increase in the processing time.

Embodiment 3

In Embodiment 3, when an FB calls another FB, an additional variable storage address is used for each instance.

FIG. 8 illustrates example addition of variables to a POU when the POU calls another POU. In the example in FIG. 8, the calling program calls an instance 1 of the FB1 type and an instance 3 of the FB1 type. The program of the FB1 type includes a variable 1 and a variable 2 and calls an instance of the FB2 type. For the instance 1, the program calls an instance 2 of the FB2 type. For the instance 3, the program calls an instance 4 of the FB2 type. The program of the FB2 type includes a variable 3 and a variable 4. Three variables (additional variables 1 to 3) are added to the program of the FB1 type, other three variables (additional variables 4 to 6) are added to the program of the FB2 type, and three more variables (additional variables 7 to 9) are further added to the program of the FB1 type.

Figure 9:
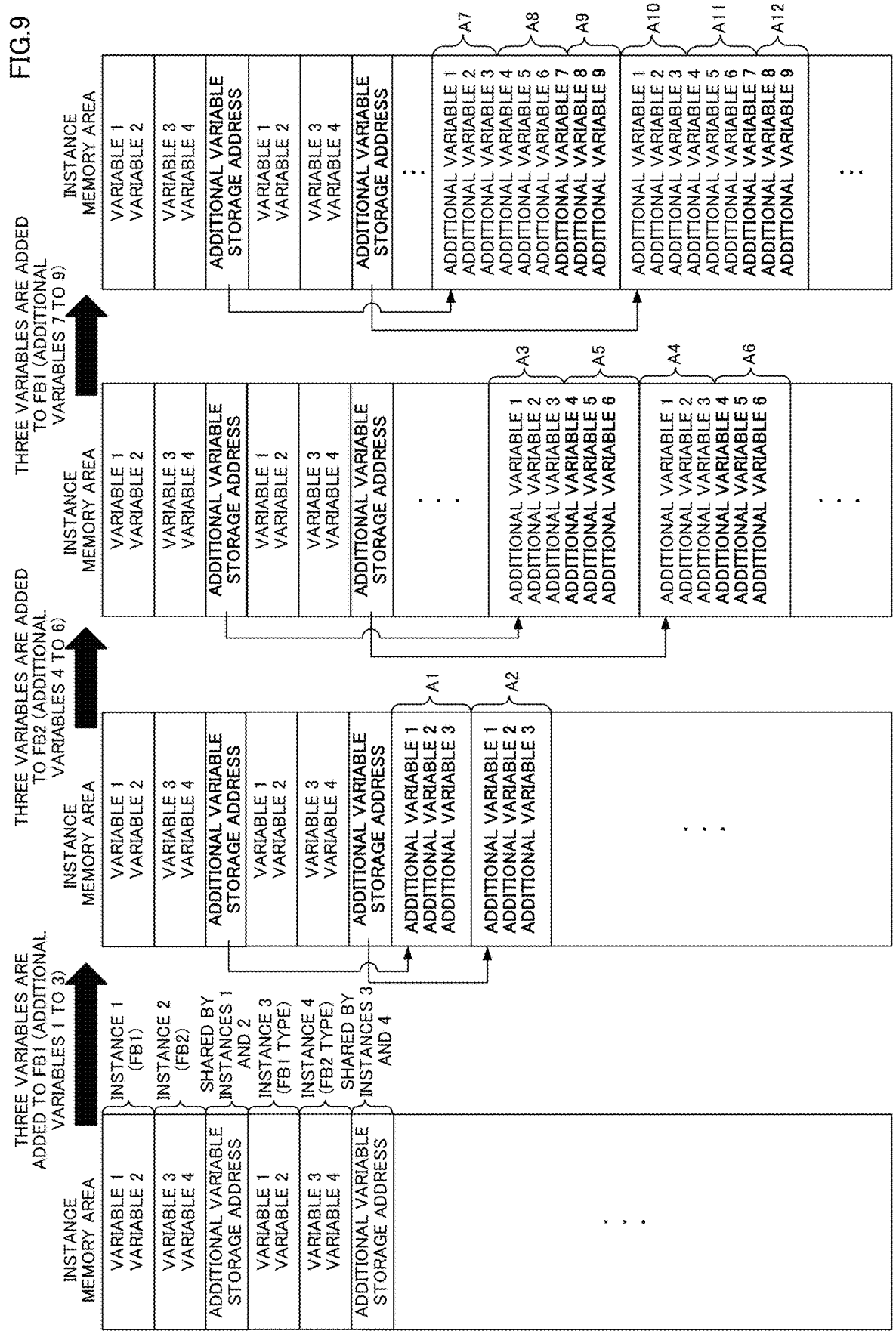
FIG. 9 is a schematic diagram describing memory allocation using shared additional variable storage addresses when variables are added to the POUs.

With reference to FIG. 9, storing variables into the instance memory area 26 is described. This is performed when, as illustrated in FIG. 8, the three variables (additional variables 1 to 3) are added to the program of the FB1 type, three variables (additional variables 4 to 6) are added to the program of the FB2 type, and three more variables (additional variables 7 to 9) are further added to the program of the FB1 type. In this example, the calling FB and the called FB share an additional variable storage address.

As illustrated in FIG. 9, when the calling FB and the called FB share the additional variable storage address and the three variables (additional variables 1 to 3) are added to the program of the FB1 type, an additional variable storage area A1 for the instance 1 is defined in the free space to store the additional variables 1 to 3. The address of the additional variable storage area A1 for the instance 1 is stored as the additional variable storage address shared by the instance 1 and the instance 2.

Similarly, when the three variables (additional variables 1 to 3) are added to the program of the FB1 type, the additional variable storage area A2 for the instance 3 is defined in the free space to store the additional variables 1 to 3. The address of the additional variable storage area A2 for the instance 3 is stored as the additional variable storage address shared by the instance 3 and the instance 4.

When the other three variables (additional variables 4 to 6) are added to the program of the FB2 type, an additional variable storage area A3 for the instance 1 and an additional variable storage area A5 for the instance 2 are sequentially defined in the free space to store the additional variables 1 to 6. The additional variable storage address shared by the instance 1 and the instance 2 is updated to the address of the additional variable storage area A3 for the instance 1.

Similarly, when the other three variables (additional variables 4 to 6) are added to the program of the FB1 type, an additional variable storage area A4 for the instance 3 and an additional variable storage area A6 for the instance 4 are sequentially defined in the free space to store the additional variables 1 to 6. The additional variable storage address shared by the instance 3 and the instance 4 is updated to the address of the additional variable storage area A4 for the instance 3.

When the three more variables (additional variables 7 to 9) are added to the program of the FB1 type, an additional variable storage area A7 for the instance 1, an additional variable storage area A8 for the instance 2, and an additional variable storage area A9 for the instance 1 are sequentially defined in the free space to store the additional variables 1 to 9. The address of the additional variable storage area A7 for the instance 1 is stored as the additional variable storage address shared by the instance 1 and the instance 2.

Similarly, when the three more variables (additional variables 7 to 9) are added to the program of the FB1 type, an additional variable storage area A10 for the instance 3, an additional variable storage area A11 for the instance 4, and an additional variable storage area A12 for the instance 3 are sequentially defined in the free space to store the additional variables 1 to 9. The address of the additional variable storage area A10 for the instance 3 is stored as the additional variable storage address shared by the instance 3 and the instance 4.

As described above, when the calling FB and the called FB share an additional variable storage address and variables are added to the calling FB, the additional variables in the called FB, in addition to the additional variables in the calling FB, are relocated. The PLC repeats program execution, but suspends the program execution (performs end processing) to relocate the additional variables without affecting the operation. A larger number of additional variables being relocated thus takes a longer time, increasing the program execution time (scan time) for program execution.

Figure 10:
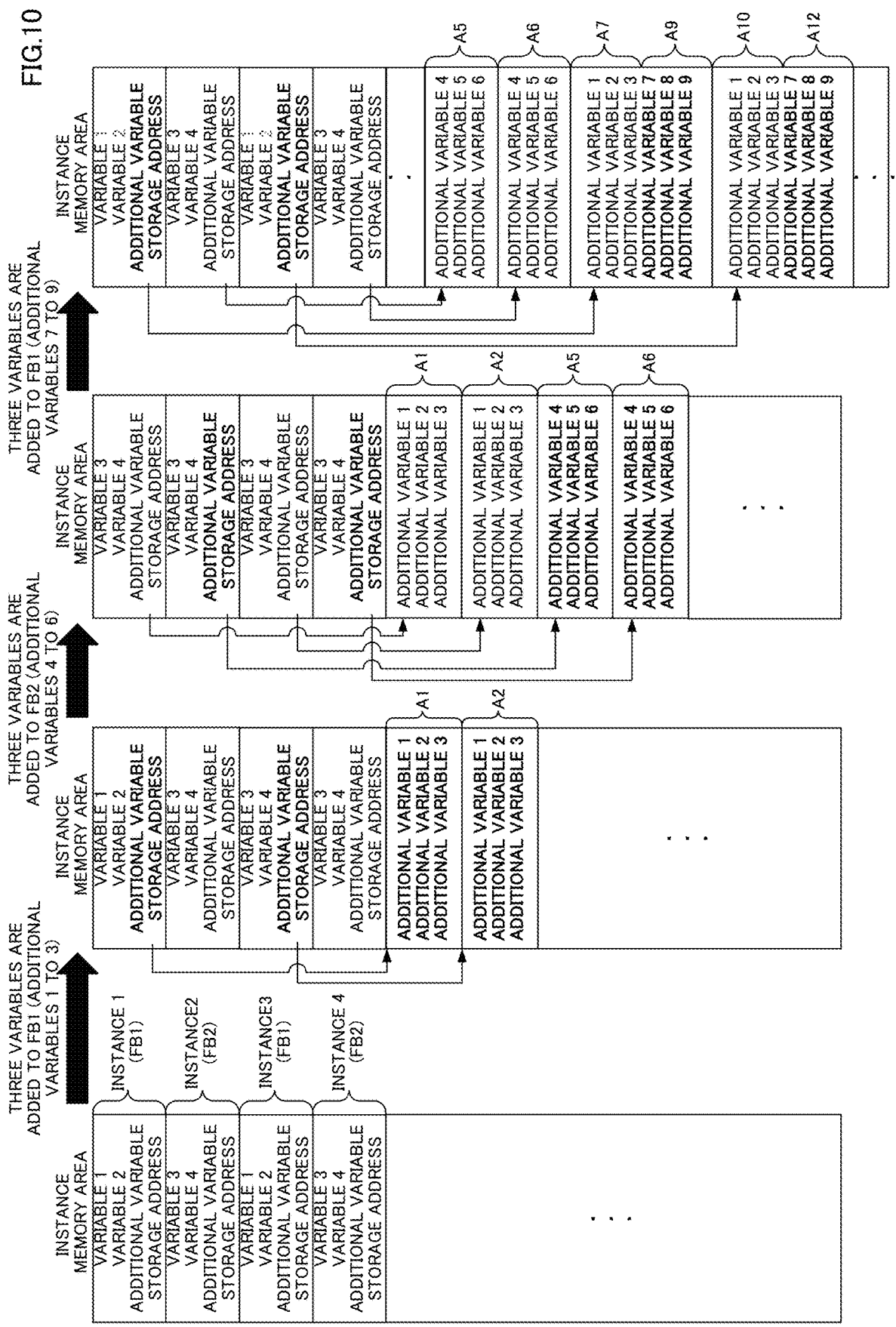
FIG. 10 is a schematic diagram describing memory allocation in a programmable controller system according to Embodiment 3 when variables are added to the POUs.

With reference to FIG. 10, storing variables into the instance memory area 26 in the programmable controller system 100 according to Embodiment 3 is described. This is performed when, as illustrated in FIG. 8, three variables (additional variables 1 to 3) are added to the program of the FB1 type, three variables (additional variables 4 to 6) are added to the program of the FB2 type, and three more variables (additional variables 7 to 9) are further added to the program of the FB1 type.

As illustrated in FIG. 10, when the three variables (additional variables 1 to 3) are added to the program of the FB1 type, the additional variable storage area A1 for the instance 1 is defined in the free space to store the additional variables 1 to 3. The address of the additional variable storage area A1 for the instance 1 is stored as the additional variable storage address in the instance 1.

Similarly, when the three variables (additional variables 1 to 3) are added to the program of the FB1 type, the additional variable storage area A2 for the instance 3 is defined in the free space to store the additional variables 1 to 3. The address of the additional variable storage area A2 for the instance 3 is stored as the additional variable storage address shared by the instance 3 and the instance 4.

When the other three variables (additional variables 4 to 6) are added to the program of the FB2 type, the additional variable storage area A5 for the instance 2 is defined in the free space to store the additional variables 4 to 6. The address of the additional variable storage area A5 for the instance 2 is stored as the additional variable storage address in the instance 2.

Similarly, when the other three variables (additional variables 4 to 6) are added to the program of the FB2 type, the additional variable storage area A6 for the instance 4 is defined in the free space to store the additional variables 4 to 6. The address of the additional variable storage area A6 for the instance 4 is stored as the additional variable storage address in the instance 4.

When the three more variables (additional variables 7 to 9) are added to the program of the FB1 type, the additional variable storage areas A7 and A9 for the instance 1 are sequentially defined in the free space to respectively store the additional variables 1 to 3 and the additional variables 7 to 9. The address of the additional variable storage area A7 for the instance 1 is stored as the additional variable storage address in the instance 1.

Similarly, when the three more variables (additional variables 7 to 9) are added to the program of the FB1 type, the additional variable storage areas A10 and A12 for the instance 3 are sequentially defined in the free space to respectively store the additional variables 1 to 3 and the additional variables 7 to 9. The address of the additional variable storage area A10 for the instance 3 is stored as the additional variable storage address in the instance 3. In other words, in the programmable controller system 100 according to Embodiment 3, the additional variable storage areas A5 and A6 are not relocated, thus reducing the increase in the program execution time.

In the programmable controller system 100 according to Embodiment 3, when a variable is determined to have been added to the FB, an additional variable storage area is defined or relocated in the free space in the memory area, and the additional variable storage address is updated for access to the added variable based on the position relative to a single address. This can avoid lowering the execution performance of the program through repeated addition of variables to the FB. When an FB calls another FB, an additional variable storage address is used for each instance. This can reduce the increase in the program execution time compared with when an additional variable storage is shared by the calling FB and the called FB.

In Embodiments 1 to 3 described above, the source code storage 11 in the development support device 1 stores the source code of the program for the PLC 2. In some embodiments, the development support device 1 may receive input of the source code of the program for the PLC 2. In this case, the development support device 1 causes the source code storage 11 to store the input source code of the program for the PLC 2.

In Embodiments 1 to 3 described above, the development support device 1 includes the source code storage 11, the instance information storage 15, the variable information storage 16, the machine language object storage 17, and the variable addition information storage 18. In some embodiments, for example, an external device or an external system may include the instance information storage 15, the variable information storage 16, the machine language object storage 17, and the variable addition information storage 18.

Figure 11:
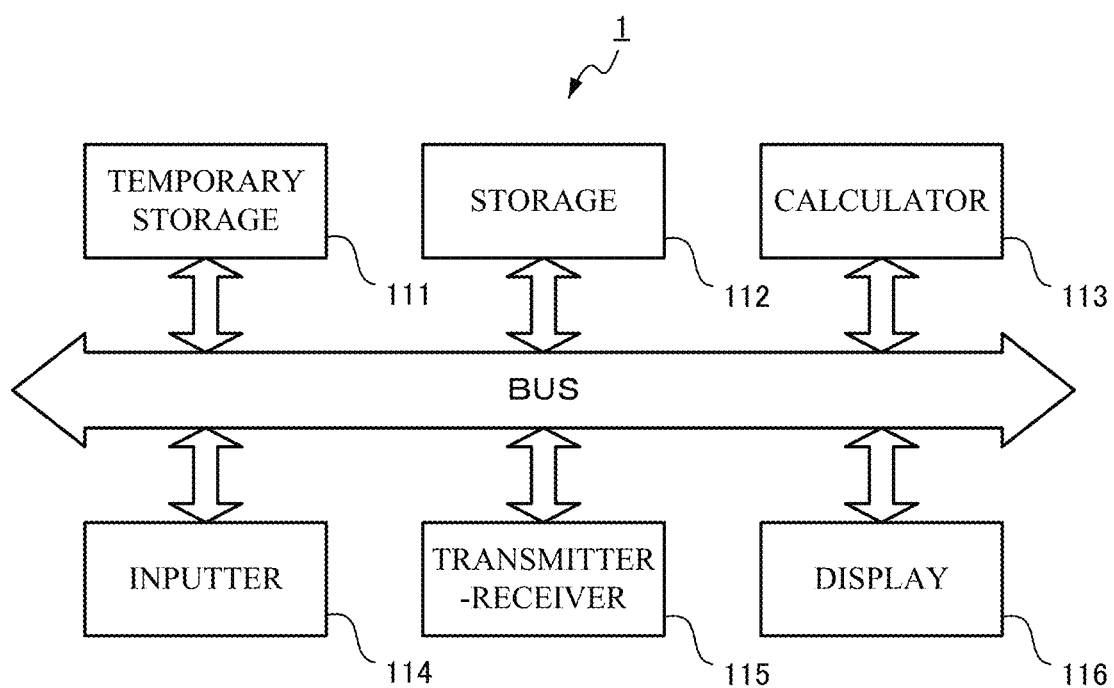
FIG. 11 is a diagram of a development support device according to Embodiments 1 to 3, illustrating the hardware configuration.

The hardware configuration of the development support device 1 is described with reference to FIG. 11. As illustrated in FIG. 11, the development support device 1 includes a temporary storage 111, a storage 112, a calculator 113, an inputter 114, a transmitter-receiver 115, and a display 116. The temporary storage 111, the storage 112, the inputter 114, the transmitter-receiver 115, and the display 116 are connected to the calculator 113 with a bus.

The calculator 113 is, for example, a central processing unit (CPU). The calculator 113 performs the processing of the compiler 12 in the development support device 1 and the variable addition information generator 14 based on a control program stored in the storage 112.

The temporary storage 111 is, for example, a random-access memory (RAM). The control program stored in the storage 112 is loaded to the temporary storage 111, and the temporary storage 111 is used as a work area for the calculator 113.

The storage 112 is a nonvolatile memory such as a flash memory, a hard disk drive, a digital versatile disc RAM (DVD-RAM), or a DVD rewritable (DVD-RW). The storage 112 prestores the program for causing the calculator 113 to perform the processing of the development support device 1, provides data stored in the program to the calculator 113 as instructed by the calculator 113, and stores data provided from the calculator 113. The instance information storage 15, the variable information storage 16, the machine language object storage 17, and the variable addition information storage 18 are included in the storage 112.

The inputter 114 includes an input device such as a keyboard and a pointing device, and an interface that connects the input device such as a keyboard and a pointing device to the bus. Information input by a user is provided to the calculator 113 through the inputter 114. In the structure in which the development support device 1 receives the input of the source code of the program for the PLC 2, the user inputs the source code of the program for the PLC 2 into the inputter 114.

The transmitter-receiver 115 includes a network terminator or a radio communication device connected to a network, and a serial interface or a local area network (LAN) interface connected to the network terminator or the communication device. The transmitter-receiver 115 functions as the communicator 19.

The display 116 is, for example, a cathode ray tube (CRT) or a liquid crystal display (LCD). For example, the display 116 displays an operation screen through which the user inputs information. In the structure in which the development support device 1 receives the input of the source code of the program for the PLC 2, the display 116 displays a screen for the user to input the source code of the program for the PLC 2.

The processes performed by the source code storage 11, the compiler 12, the variable addition information generator 14, the instance information storage 15, the variable information storage 16, the machine language object storage 17, the variable addition information storage 18, and the communicator 19 in the development support device 1 illustrated in FIG. 1 are implemented by the control program using resources including the temporary storage 111, the calculator 113, the storage 112, the inputter 114, the transmitter-receiver 115, and the display 116.

The hardware configuration and the flowcharts are mere examples, and may be changed or modified as appropriate.

The main components that perform the processing of the development support device 1 including the calculator 113, the temporary storage 111, the storage 112, the inputter 114, the transmitter-receiver 115, and the display 116 can be implemented with a common computer system, rather than with a dedicated system. For example, a computer program executable to implement the above operation may be stored in a non-transitory computer-readable recording medium, such as a flexible disk, a compact disc read-only memory (CD-ROM), or a DVD-ROM for distribution. The computer program may be installed in a computer to provide the development support device 1 that performs the above processing. In some embodiments, the computer program may be stored in a storage device included in a server device on a communication network such as the Internet, and may be downloaded by a common computer system to implement the development support device 1.

In the system with the above functions of the development support device 1 implementable partially by the operating system (OS) and partially by an application program or through cooperation between the OS and the application program, portions executable by the application program other than the OS may be stored in a non-transitory recording medium or a storage device.

The computer program may be superimposed on a carrier wave to be provided through a communication network. For example, the computer program may be posted on a bulletin board system (BBS) on the communication network to be provided through the communication network. The computer program may be activated and executed under the control of the OS in the same manner as another application program to perform the above processing.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Development support device
2 PLC
11 Source code storage
12 Compiler
14 Variable addition information generator
15 Instance information storage
16 Variable information storage
17 Machine language object storage
18 Variable addition information storage 19 Communicator
21 Communicator
24 Machine language object storage
25 Variable addition information storage
26 Instance memory area
27 Program executor
28 Variable addition responder
100 Programmable controller system
111 Temporary storage
112 Storage
113 Calculator
114 Inputter
115 Transmitter-receiver
116 Display

The invention claimed is:

1. A programmable controller system that compiles source code of a program for a programmable controller to generate a machine language object and causes the programmable controller to execute the machine language object, the programmable controller system comprising:
processing circuitry to:
store, into an initial variable storage area in a memory area in the programmable controller, an initial variable in a program organization unit with variables included in the source code written with the program organization unit and an additional variable storage address indicating an address of an additional variable storage area to store a variable added to the program organization unit,
determine whether a variable has been added to the program organization unit,
collectively store, when a variable is determined to have been added to the program organization unit, all additional variables associated with the program organization unit with the added variable into the additional variable storage area in the memory area,
compile the source code to generate the machine language object,
define or relocate, when a variable is determined to have been added to the program organization unit, the additional variable storage area for the program organization unit with the added variable in a free space in the memory area, wherein variables are added to a type of the program organization unit that includes a functional block type and variables are added to many program organization units when the program organization unit calls another program organization unit and additional variables in a called functional block type,
update the additional variable storage address,
define, in compiling the source code, a first spare area in the initial variable storage area and a second spare area in the additional variable storage area,
store, when a variable is determined to have been added to the program organization unit, the additional variables associated with the program organization unit with the added variable into the first spare area,
store, when a total size of the additional variables exceeds a size of the first spare area, an additional variable of the additional variables unstored in the first spare area into the additional variable storage area,
define, when a variable associated with the program organization unit is determined to have been added and the total size of the additional variables associated with the program organization unit with the added variable exceeds the size of the first spare area, the additional variable storage area in the free space in the memory area,
relocate, when the total size of the additional variables associated with the program organization unit with the added variable exceeds a size of the second spare area, the additional variable storage area to the free space in the memory area,
update the additional variable storage address,
update the machine language object,
repeat execution of the program, and
suspend the execution of the program to relocate the additional variables without affecting operation of the program.

2. The programmable controller system according to claim 1, wherein
in compiling the source code, the processing circuitry stores, when a function block that is type of the program organization unit calls another function block, the additional variable storage address for each function block into the initial variable storage area.

3. A development support device for compiling source code of a program for a programmable controller to generate a machine language object, the development support device comprising:
processing circuitry to:
store, into an initial variable storage area in a memory area in the programmable controller, an initial variable in a program organization unit with variables included in the source code written with the program organization unit and an additional variable storage address indicating an address of an additional variable storage area to store a variable added to the program organization unit,
determine whether a variable has been added to the program organization unit,
collectively store, when a variable is determined to have been added to the program organization unit, all additional variables associated with the program organization unit with the added variable into the additional variable storage area in the memory area,
compile the source code to generate the machine language object,
generate, when a variable is determined to have been added to the program organization unit, variable addition information including a source address and a destination address of the additional variable storage area for the program organization unit with the added variable,
transmit the machine language object and variable addition information to the programmable controller,
define, in compiling the source code, a first spare area in the initial variable storage area and a second spare area in the additional variable storage area,
store, when a variable is determined to have been added to the program organization unit, the additional variables associated with the program organization unit with the added variable into the first spare area,
store, when a total size of the additional variables exceeds a size of the first spare area, an additional variable of the additional variables unstored in the first spare area into the additional variable storage area,
define, when a variable associated with the program organization unit is determined to have been added and the total size of the additional variables associated with the program organization unit with the added variable exceeds the size of the first spare area, the additional variable storage area in the free space in the memory area, wherein variables are added to a type of the program organization unit that includes a functional block type and variables are added to many program organization units when the program organization unit calls another program organization unit and additional variables in a called functional block type, relocate, when the total size of the additional variables associated with the program organization unit with the added variable exceeds a size of the second spare area, the additional variable storage area to the free space in the memory area, update the additional variable storage address, and update the machine language object, wherein the programmable controller is configured to repeat execution of the program and suspend the execution of the program to relocate the additional variables without affecting operation of the program.

4. The development support device according to claim 3, wherein in compiling the source code, the processing circuitry stores, when a function block that is type of the program organization unit calls another function block, the additional variable storage address for each function block into the initial variable storage area.

5. A non-transitory computer-readable recording medium storing a program, the program causing a computer to execute processing comprising:

storing, into an initial variable storage area in a memory area in a programmable controller, an initial variable in a program organization unit with variables included in source code of a program for the programmable controller written with the program organization unit and an additional variable storage address indicating an address of an additional variable storage area to store a variable added to the program organization unit, determining whether a variable has been added to the program organization unit, collectively storing, when a variable is determined to have been added to the program organization unit, all additional variables associated with the program organization unit with the added variable into the additional variable storage area in the memory area, compiling the source code to generate a machine language object, generating variable addition information including, when a variable is determined to have been added to the program organization unit, a source address and a destination address of the additional variable storage area for the program organization unit with the added variable, transmitting the machine language object and variable addition information to the programmable controller, defining, in compiling the source code, a first spare area in the initial variable storage area and a second spare area in the additional variable storage area, storing, when a variable is determined to have been added to the program organization unit, the additional variables associated with the program organization unit with the added variable into the first spare area, storing, when a total size of the additional variables exceeds a size of the first spare area, an additional variable of the additional variables unstored in the first spare area into the additional variable storage area, defining, when a variable associated with the program organization unit is determined to have been added and the total size of the additional variables associated with the program organization unit with the added variable exceeds the size of the first spare area, the additional variable storage area in the free space in the memory area, wherein variables are added to a type of the program organization unit that includes a functional block type and variables are added to many program organization units when the program organization unit calls another program organization unit and additional variables in a called functional block type, relocating, when the total size of the additional variables associated with the program organization unit with the added variable exceeds a size of the second spare area, the additional variable storage area to the free space in the memory area, updating the additional variable storage address, update the machine language object, wherein the programmable controller is configured to repeat execution of the program and suspend the execution of the program to relocate the additional variables without affecting operation of the program.

* * * * *